United States Patent
Dunn et al.

(10) Patent No.: US 9,519,185 B2
(45) Date of Patent: Dec. 13, 2016

(54) LIGHTING SYSTEM FOR TRANSPARENT LIQUID CRYSTAL DISPLAY

(71) Applicant: Manufacturing Resources International, Inc., Alpharetta, GA (US)

(72) Inventors: William Dunn, Alpharetta, GA (US); Harry Presley, Alpharetta, GA (US); Mike Brown, Alpharetta, GA (US); Chris Tran, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 114 days.

(21) Appl. No.: 14/230,765

(22) Filed: Mar. 31, 2014

(65) Prior Publication Data

US 2014/0211454 A1 Jul. 31, 2014

Related U.S. Application Data (63) Continuation-in-part of application No. 13/650,951, filed on Oct. 12, 2012, now Pat. No. 8,988,635.

(51) Int. Cl.
*G02F 1/1335* (2006.01)
*G02F 1/1333* (2006.01)
*G09G 3/34* (2006.01)

(52) U.S. Cl.
CPC ... *G02F 1/133615* (2013.01); *G02F 1/133308* (2013.01); *G09G 3/3406* (2013.01); *G09G 2330/02* (2013.01)

(58) Field of Classification Search
CPC .......... H01L 2924/12041; H01L 33/06; H01L 51/502; H01L 21/02601; H01L 21/02603; H01L 2251/5369; H01L 29/0665; H01L 29/127; H01L 29/66469; H01L 29/66977; H01L 29/775; H01L 31/035227; G02B 6/0073; G02B 6/003; G02B 6/005; G02B 5/18; G02B 5/04; G02B 5/045; G02B 7/02; B82Y 20/00; B82Y 10/00; B82Y 30/00; B82Y 40/00; B82Y 15/00; F21Y 2101/02; F21Y 2105/001; F21Y 2113/005; G02F 2001/133614; G02F 2001/133616; G02F 1/133615; G02F 1/29; G02F 1/133526; G02F 1/133603; G02F 1/133606; G02F 1/134309; G02F 2202/36; G09F 13/04; G09F 13/18; G09F 21/10; G09F 9/35; F21V 13/08; F21V 15/01; F21V 5/04; F21V 7/005; H05B 33/0803; G01N 2201/062; G01N 2201/0626; G01N 2201/0627; G01N 33/588
(Continued)

(56) References Cited

U.S. PATENT DOCUMENTS 7,513,637 B2 * 4/2009 Kelly ............... A47F 3/001
362/125
8,294,168 B2 * 10/2012 Park ............... F21K 9/00
257/98

(Continued)

OTHER PUBLICATIONS

3M Optical Systems Division, Immerse yourself in Color 3M™ Quantum Dot Enhancement Film, Brochure, 3M Company, copyright 2013.

*Primary Examiner* — Thoi Duong
(74) *Attorney, Agent, or Firm* — Standley Law Group LLP (57) ABSTRACT

Exemplary embodiments provide a lighting system for a transparent LCD having opposing vertical edges, the system having a mullion lighting assembly positioned adjacent to each vertical edge of the transparent LCD, each mullion
(Continued)

lighting assembly having sidewalls defining a center channel. A plurality of LEDs are positioned along the sidewall of each mullion assembly and on a side of the sidewall that opposes the center channel. The LEDs are preferably placed in conductive thermal communication with the sidewall and preferably have a quantum dot film positioned over each LED. A fan is preferably positioned to draw cooling air through the center channel.

20 Claims, 8 Drawing Sheets

(58) Field of Classification Search
USPC .... 349/62, 65, 63, 1, 61, 64, 66, 67, 95, 58;
362/612, 84, 335, 249.02, 296.02, 311.02,
362/311.03, 373, 600, 603, 97.1, 97.2,
362/97.3; 345/39
See application file for complete search history.

(56) References Cited

U.S. PATENT DOCUMENTS

| | | | |
|---|---|---|---|
| 8,674,390 B2* | 3/2014 | Harris | H01L 33/507 257/100 |
| 8,683,745 B2* | 4/2014 | Artwohl | A47F 3/0434 49/70 |
| 2005/0265019 A1 | 12/2005 | Sommers | |
| 2005/0276053 A1* | 12/2005 | Nortrup | F21V 29/83 362/294 |
| 2007/0151274 A1 | 7/2007 | Roche | |
| 2007/0171647 A1 | 7/2007 | Artwohl | |
| 2010/0162747 A1 | 7/2010 | Hamel | |
| 2011/0083460 A1 | 4/2011 | Thomas | |
| 2011/0116231 A1 | 5/2011 | Dunn | |
| 2012/0274882 A1* | 11/2012 | Jung | G02F 1/133617 349/96 |

* cited by examiner

FIG - 15

LIGHTING SYSTEM FOR TRANSPARENT LIQUID CRYSTAL DISPLAY

CROSS-REFERENCE TO RELATED APPLICATIONS

This application is a continuation-in-part of U.S. application Ser. No. 13/650,951, filed on Oct. 12, 2012 which is herein incorporated by reference in its entirety.

TECHNICAL FIELD

Embodiments generally relate to a lighting system for a transparent liquid crystal display (LCD).

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides mullion light assemblies adjacent to each vertical edge of the transparent LCD. Each mullion light assembly preferably contains a center channel which allows cooling air to pass through the channel. LED mounting substrates along with a plurality of LEDs are positioned along the length of the center channel sidewalls and are angled inwardly towards the rear of the display case. Preferably, the LEDs are in conductive thermal communication with the center channel sidewalls. In an exemplary embodiment, thermal fins are also placed in thermal communication with the center channel sidewalls. Electrical components, including the power modules for driving the LEDs may also be positioned within the mullions and may be placed in thermal communication with the center channel sidewalls and the optional thermal fins.

In an exemplary embodiment, an optional lens is positioned adjacent to the LEDs and is adapted to collimate the light exiting the LEDs and the lens. In further embodiments, each LED is positioned between a pair of vertical louvers so as to direct the light away from the LCD and towards the rear of the display case (or towards the goods within the display case). Alternatively, a flange may extend from the sidewall of the center channel and angle towards the rear of the case so as to direct the light away from the LCD and towards the rear of the display case (or towards the goods within the display case).

When used with a display case having a door, a sensor may be positioned so as to sense whether the door is open or closed. When open, the LEDs may be turned off so that a consumer is not exposed to high light levels. A temperature sensor may also be used to turn on/off the cooling fans when a maximum temperature has been reached.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
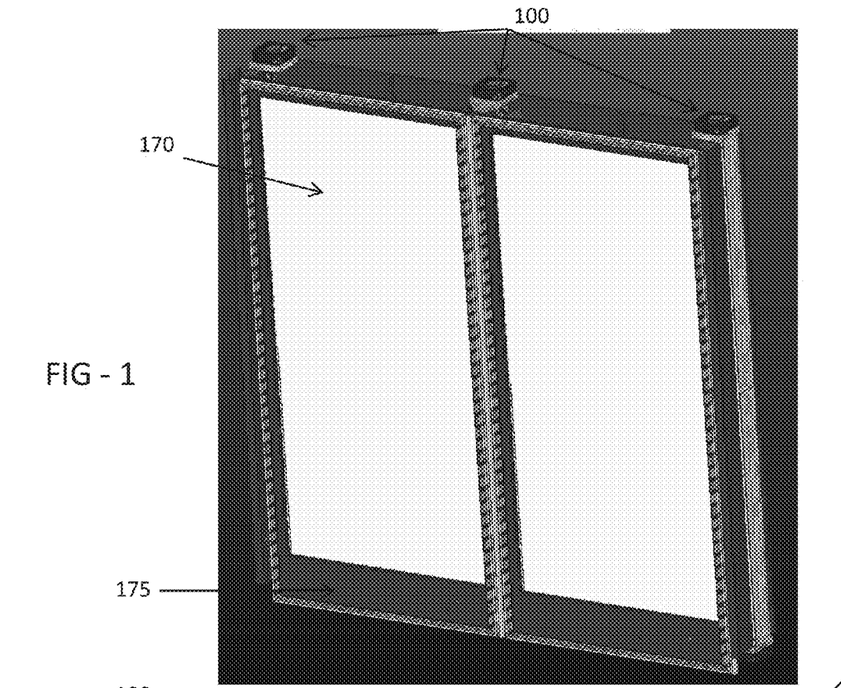
FIG. 1 is a perspective view of a pair of transparent LCDs for use within a display case.

FIG. 1 is a perspective view of a pair of transparent LCDs for use within a display case. Protective glass 170 is preferably positioned in front of the LCDs and contains a masking portion 175 surrounding at least a portion of the perimeter of the protective glass 170. It should be noted that only the front glass/LCD assemblies are shown in these figures, as the remaining details of the case are commonly known and do not depend upon the transparent LCDs and the exemplary lighting system. The embodiments of the lighting system described herein can be used with any number of display case designs, either temperature controlled or not, and with doors that open or glass that remains stationary.

Figure 2:
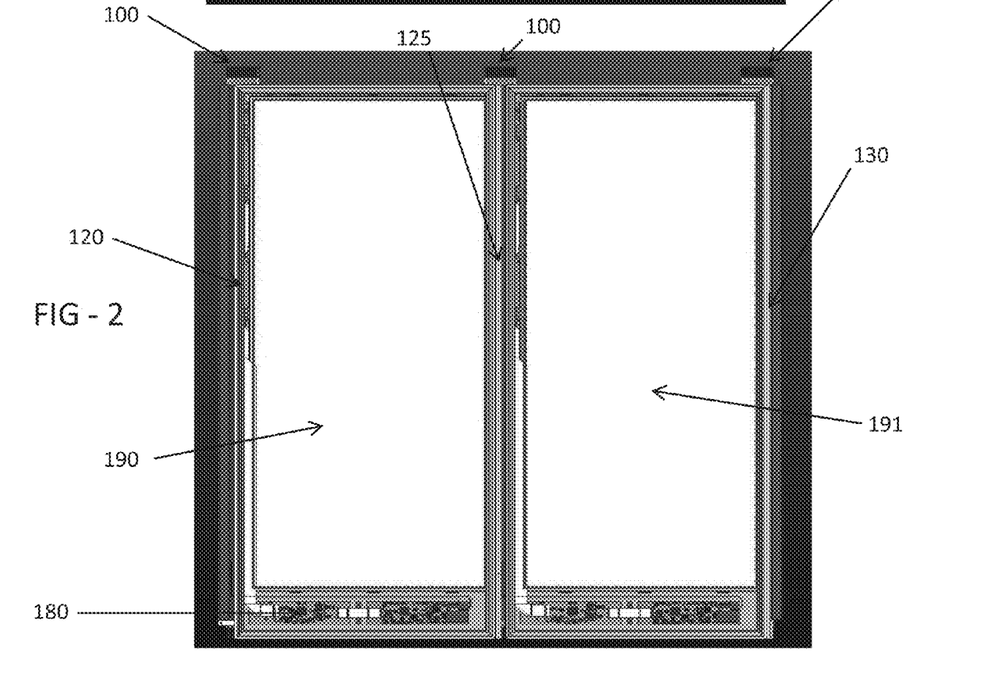
FIG. 2 is a front elevation view of the display case from FIG. 1 where the front glass and masking has been removed to show electrical components for operating the LCD and lighting assembly.

FIG. 2 is a front elevation view of the front glass/LCD assemblies from FIG. 1 where the front glass 170 and masking 175 has been removed to show electrical components 180 for operating the LCD 190 and lighting assembly. The electrical components 180 may include any or all of the following: timing and control board (TCON), video player, hard drive/storage, microprocessor/CPU, wireless receiver, cellular data receiver, and internet connectivity. At least some of the electrical components 180 are in electrical communication with the LCD 190. Preferably, the power (for the LEDs and/or electrical components 180) and the video signals are supplied to the electrical components 180 through CAT 6 cabling.

Transparent LCD 190 has edge mullion 120 adjacent to a first side with center mullion 125 adjacent to the opposing side. Similarly, transparent LCD 191 has center mullion 125 adjacent to a first side with edge mullion 130 adjacent to the opposing side. Fans 100 are positioned adjacent to each of the mullions 120, 125, and 130 and adapted to draw cooling air through the mullion. Although shown at the top of each mullion, fans 100 could also be placed at the bottom of the mullion or within the mullion. One or more fans could be used with each mullion.

Figure 3:
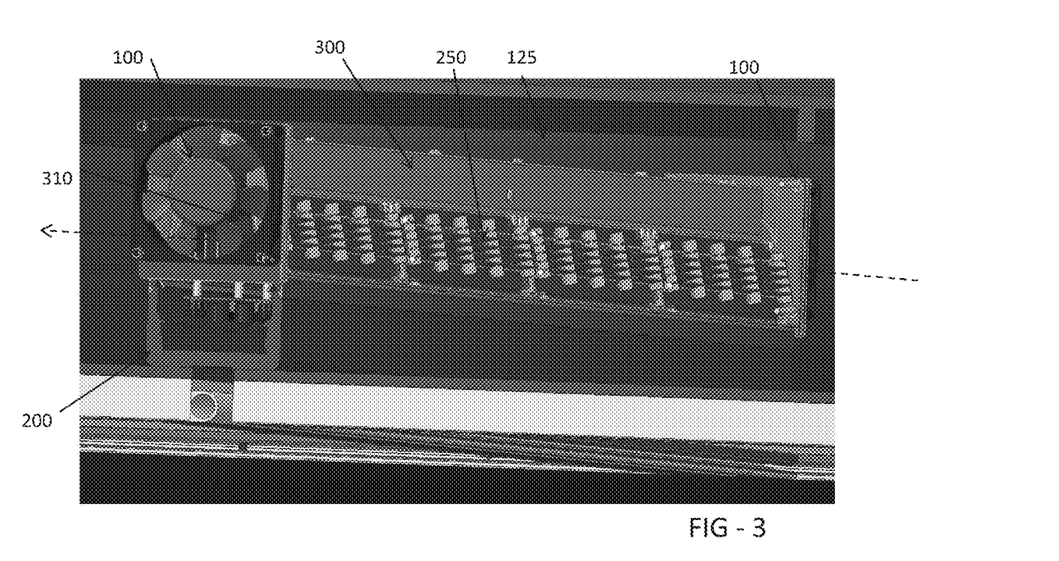
FIG. 3 is a top perspective view looking down the center mullion and showing an optional air flow embodiment.

FIG. 3 is a top perspective view looking down the center mullion 125 and showing an optional air flow embodiment. The center mullion 125 is comprised of a base mullion assembly 200 which is generally adjacent to the edge of the front glass/LCD assembly. A mullion lighting assembly 300 is preferably attached to the base mullion assembly 200. In some embodiments, the base mullion assembly 200 is a common mullion assembly found in traditional display cases, such that the mullion lighting assembly 300 can be easily retrofit onto the existing base mullions found in cases that have already been built and possibly installed.

In this embodiment, fans 100 are positioned at the top and bottom of the mullion lighting assembly 300 so as to draw a path of cooling air through a center channel 310 running down the center of the mullion lighting assembly 300. The fans 100 may draw cooling air from the top to the bottom or from the bottom to the top of the mullion lighting assembly 300. Louvers 250 are positioned along the sides of the mullion lighting assembly 300 and are adapted to control the light emitted from the mullion lighting assembly 300.

Figure 4:
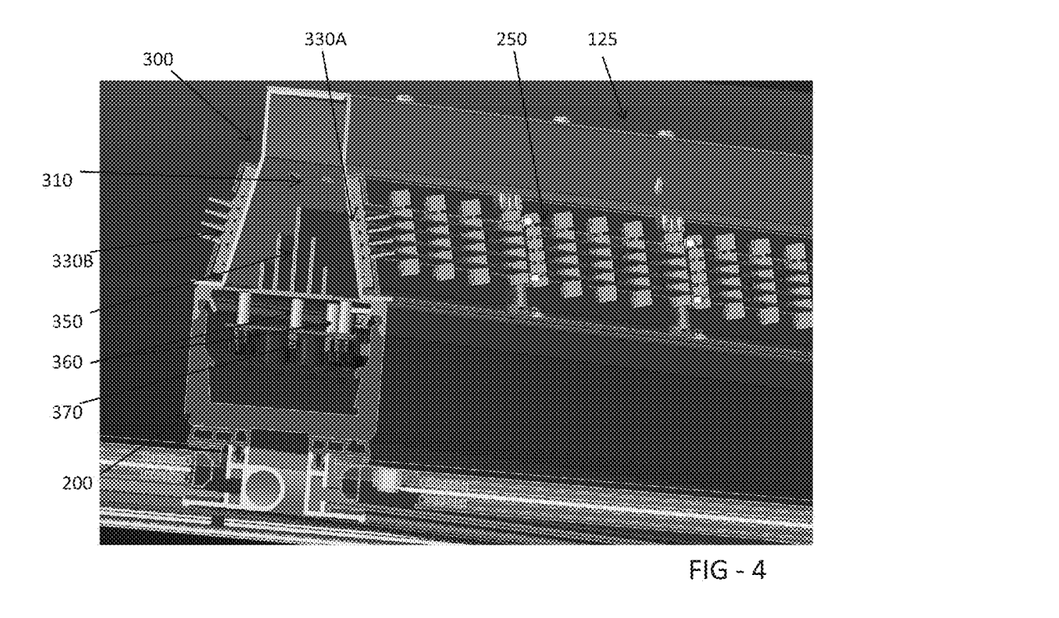
FIG. 4 is a top perspective view of the center mullion where the fan has been removed.

FIG. 4 is a top perspective view of the center mullion 125 where the fan 100 has been removed. The mullion lighting assembly 300 for the center mullion 125 generally contains a trapezoidal cross-section where a base portion contains a plurality of thermal fins 350 on the side facing the center channel 310 and setoff mounts 360 for electrical components 370 on the side opposing the center channel 310. While this orientation is preferable, it is also contemplated to place the electrical components within the center channel 310 while placing the thermal fins 350 on the opposing side (or using no thermal fins 350 at all).

The legs of the trapezoidal mullion lighting assembly 300 are preferably angled relative to the base portion, and contain the LED assemblies 330A and 330B. As this LED assembly 300 is for the center mullion 125, it contains a LED assembly 330A (for the transparent LCD 191) and an opposing LED assembly 330B (for the transparent LCD 190). For the edge mullions 120 and 130, only one LED assembly is necessary, so they would not necessarily have the trapezoidal cross-section as shown here or the dual LED assemblies, although both could still be used. Preferably, the LED assemblies 330A and 330B are angled inwardly towards the center channel 310. Although shown and described with a trapezoidal cross-section, a triangular cross-section is specifically contemplated as well and would be within the scope of the invention.

The LED assemblies 330A and 330B are preferably in conductive thermal communication with the sidewalls of the center channel 310. In an exemplary embodiment, the LED assemblies 330A and 330B are also in conductive thermal communication with the thermal fins 350. The louvers 250 are preferably positioned adjacent to the LED assemblies 330A and 330B. The electrical components 370 are preferably in conductive thermal communication with the sidewalls of the center channel 310. In an exemplary embodiment, the electrical components 370 are also in conductive thermal communication with the thermal fins 350. The electrical components 370 may include the power supplies for driving the LED assemblies 330A and 330B. The electrical components 370 may also include the power supplies for driving the transparent LCD and the electrical components 180.

Figure 5:
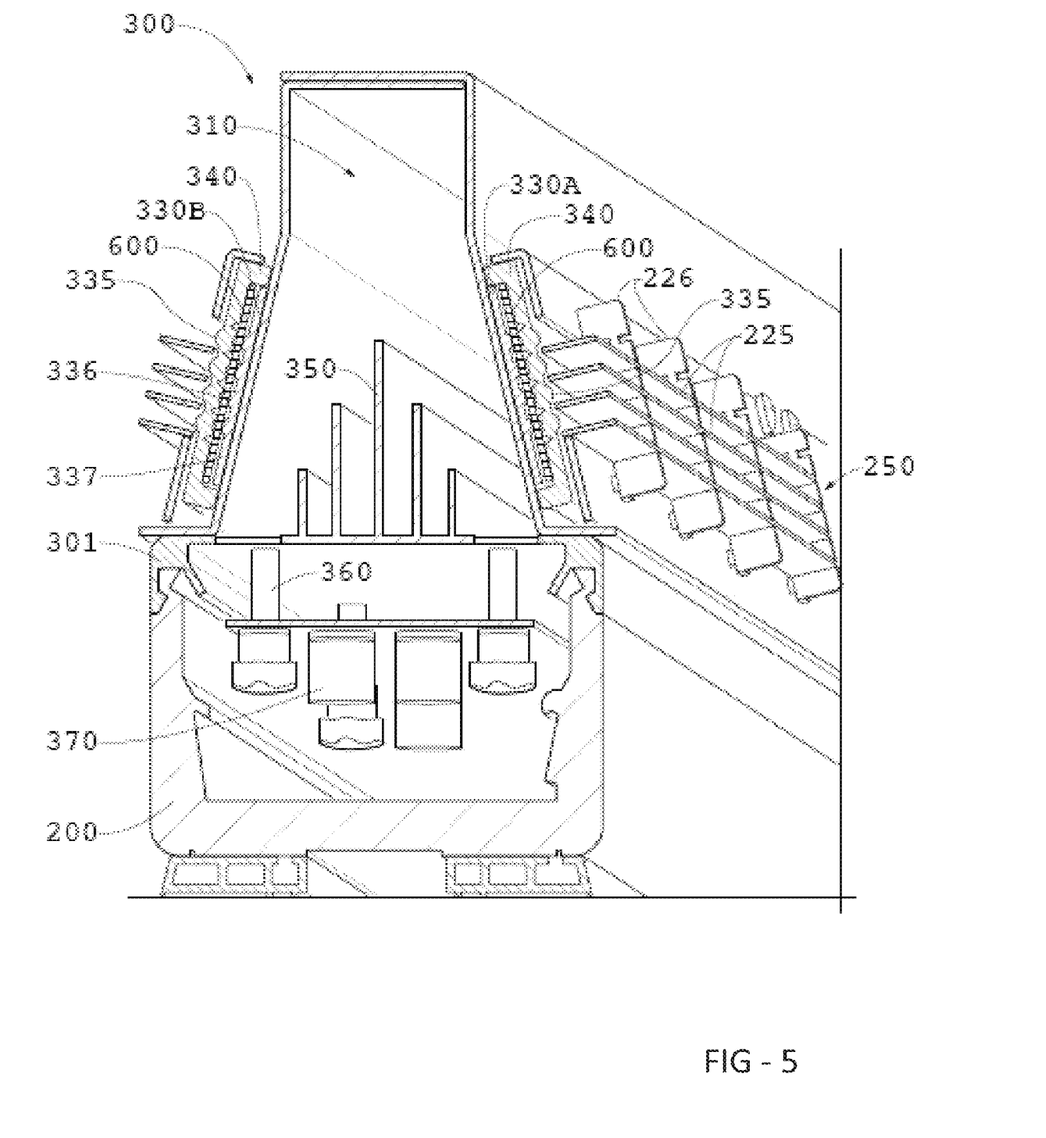
FIG. 5 is a top perspective view of the center mullion showing the details of the mullion lighting assembly.

FIG. 5 is a top perspective view of the center mullion showing the details of the mullion lighting assembly 300. An LED mounting substrate 337 contains a plurality of LEDs 336 and is positioned adjacent to the sidewalls of the center channel 310. In some embodiments, the LED mounting substrate 337 is a PCB and in an exemplary embodiment the LED mounting substrate is a metal core PCB. Here, an optional lens 340 is positioned in front of the LED mounting substrate 337. In this embodiment, the optional lens 340 contains a plurality of collimating elements 335, where each collimating element 335 is centered above an LED 336. Also shown in this embodiment is an optional quantum dot film layer 600, positioned between the LEDs 336 and the optional lens 340. An exemplary quantum dot film would be the 3M™ quantum dot enhancement film. www.3m.com/displayfilms In this embodiment, the louvers 250 are positioned adjacent to the optional lens 340, however, it should be noted that the louvers 250 are optional, as some embodiments may not require the louvers 250 if the lens 340 and the collimating elements 335 are properly designed. However, in this embodiment the louvers 250 are comprised of vertical louvers 225 and horizontal louvers 226 which are substantially perpendicular to the vertical louvers 225. In some embodiments, only the vertical louvers 225 may be used. Here, a vertical louver 225 is positioned on each side of the LED 336 and collimating element 335 pair and arranged so as to direct the emitted light away from the LCD and towards the rear of the display case or towards the goods within the display case. In other words, each LED 336/ collimating element 336 is preferably positioned between a pair of vertical louvers 225 which prevents the majority of the emitted light from passing directly through the LCD (a phenomenon known as 'headlighting' which will be discussed further below.) The vertical louvers 225 are adapted to control the direction of the light in the horizontal plane. The horizontal louvers 226 may control the direction of the light in the vertical plane.

Also in this embodiment, the mullion lighting assembly 300 contains a tab 301 which overlaps an opposing tab on the base mullion 200. Here, the mullion lighting assembly 300 can simply snap onto the base mullion 200. Of course, many other variations for attaching the mullion lighting assembly 300 to the base mullion 200, including but not limited to fasteners, clips, adhesive, or welding.

Although shown as a series of members which extend from the base of the mullion lighting assembly 300, where the members are longest near the center of the channel 310 and become shorter as one moves from the center towards the lighting assemblies 330A and 330B, this orientation for the thermal fins 350 is not required. While this design provides an exemplary cooling performance, all that is required of the thermal fins 350 is to provide an increased surface area for the cooling air to extract heat from the thermal fins 350. Preferably, the thermal fins 350 are comprised of a thermally conductive material. In an exemplary embodiment the thermal fins 350 would be metallic, preferably aluminum.

Figure 6:
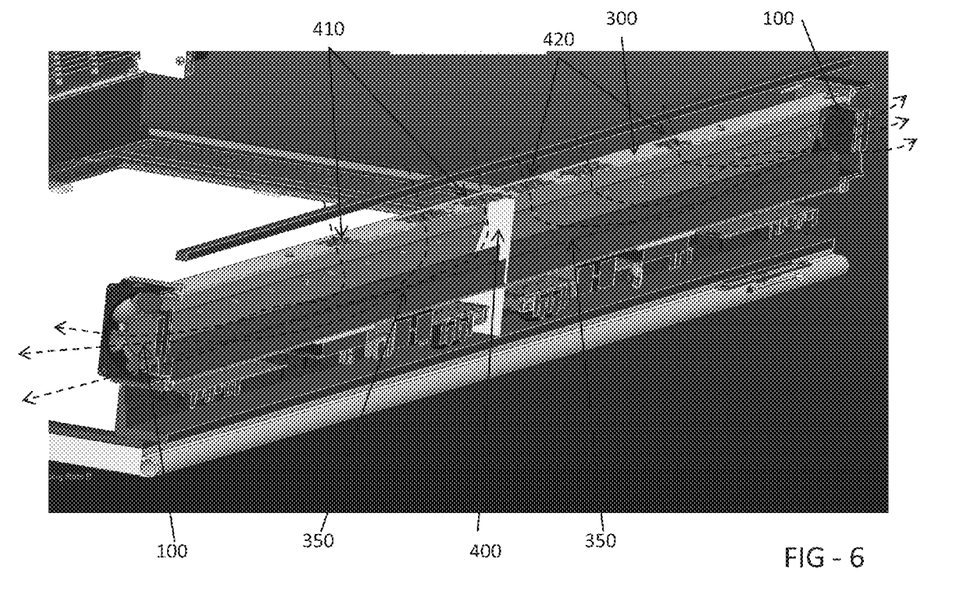
FIG. 6 is a perspective sectional view showing another optional air flow embodiment.

FIG. 6 is a perspective sectional view showing another optional air flow embodiment. In this embodiment, a dividing element 400 is positioned near the mid-point of the center channel 310, dividing the center channel into a first portion with apertures 410 and a second portion with apertures 420. A fan 100 is positioned at the exit of each portion. When the fan 100 is in operation, cooling air is drawn into the center channel 310 through apertures 410/420, pulled through the center channel 310, and exhausted at the exits near the fan 100. Of course, the opposite flow would also be possible, where cooling air is drawn into the channel 310 at the fan 100 and then exhausted out of the apertures 410/420. In this exemplary embodiment, a higher number of apertures are positioned near the dividing element 400 than near the fans 100. The apertures 410/420 are preferably positioned near the top of the center channel 310 sidewalls.

Figure 7:
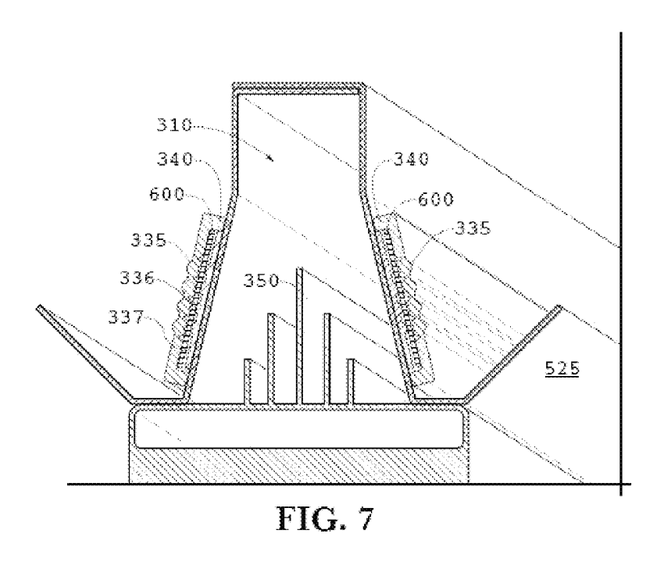
FIG. 7 is a top perspective view of another embodiment for the mullion lighting assembly.

FIG. 7 is a top perspective view of another embodiment for the mullion lighting assembly 500. In this embodiment, the channel 310 contains a base portion having the thermal fins 350, and side portions which angle inwardly towards the center of the channel 310. The side portions contain the LED mounting substrate 337 with a plurality of LEDs 336. This embodiment also contains the optional lens 340 where a collimating element 335 is positioned adjacent to each LED 336. Also shown in this embodiment is an optional quantum dot film layer 600, positioned between the LEDs 336 and the optional lens 340. Notably in this embodiment, a flange 525 extends from the base portion of the mullion lighting assembly 500, from an area adjacent to the bottom of LED mounting substrate 337. The flange 525 angles towards the LEDs 336 as it extends away from the base portion. In other words, the flange 525 is positioned at an acute angle relative to the transparent LCD.

Figure 8:
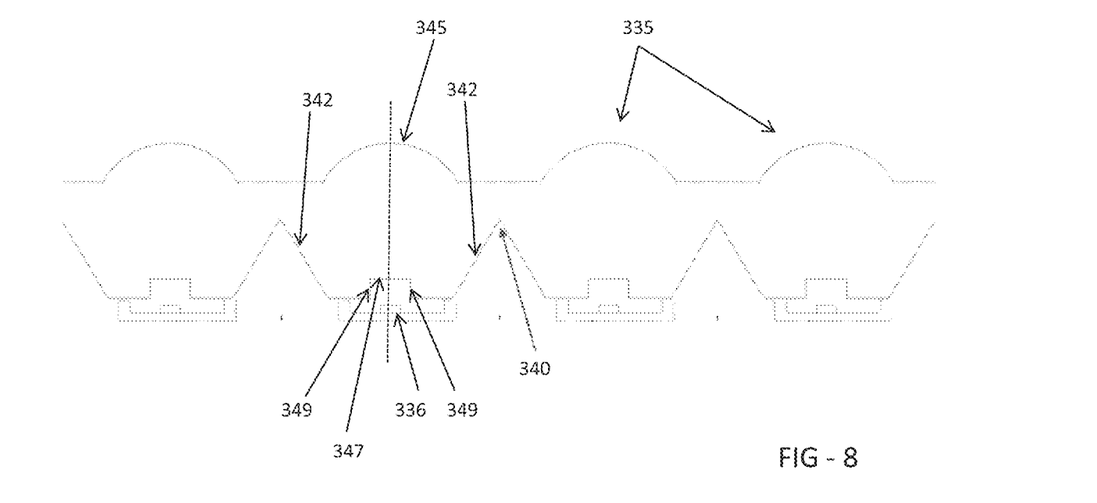
FIG. 8 is a sectional view showing an exemplary embodiment of the optional lens and LEDs.

FIG. 8 is a sectional view showing an exemplary embodiment of the optional lens 340 and LEDs 336. Each collimating element 335 is preferably positioned above the centerline of each LED 336. Each collimating element 335 preferably contains a notch which is adjacent to each LED 336. The notch may be defined as a top surface 347 which is substantially perpendicular to the center axis of the LED 336, as well as at least two side surfaces 349 which are substantially perpendicular to the top surface 347. Some embodiments of the optional lens 340 may contain four side surfaces 349 (as this view is a sectional view, these additional side surfaces are not shown).

This embodiment of the lens also includes a pair of angled reflecting surfaces 342 which begin near the LED mounting substrate and angle away from the center axis of the LED 336. This embodiment of the lens also includes an arc 345 which is positioned above the LED 336 and is preferably centered about the central axis of the LED. In an exemplary embodiment, the angled reflecting surfaces 342 preferably operate via total internal reflection (TIR). Also in an exemplary embodiment, the surfaces 347, 349, and 345 are preferably coated with an anti-reflective (AR) coating.

Figure 9:
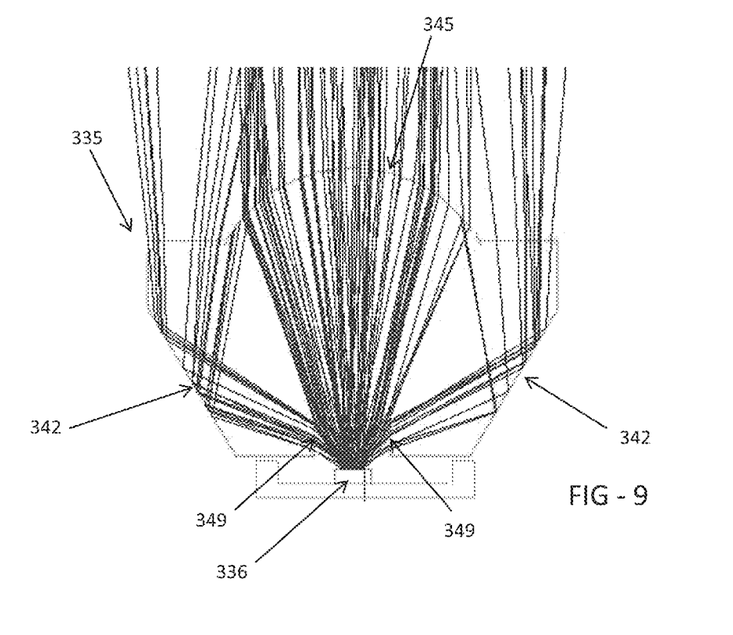
FIG. 9 is an optical ray trace of the LED and lens embodiment shown in FIG. 8.

FIG. 9 is an optical ray trace of the LED and lens embodiment shown in FIG. 8. Ideally, the majority of the light which enters through the side surfaces 349 of the notch will reflect off surfaces 342 and exit the top surface of the lens. Also ideally, the majority of the light which enters the top surface 347 of the notch exits through the arc 345.

Figure 10:
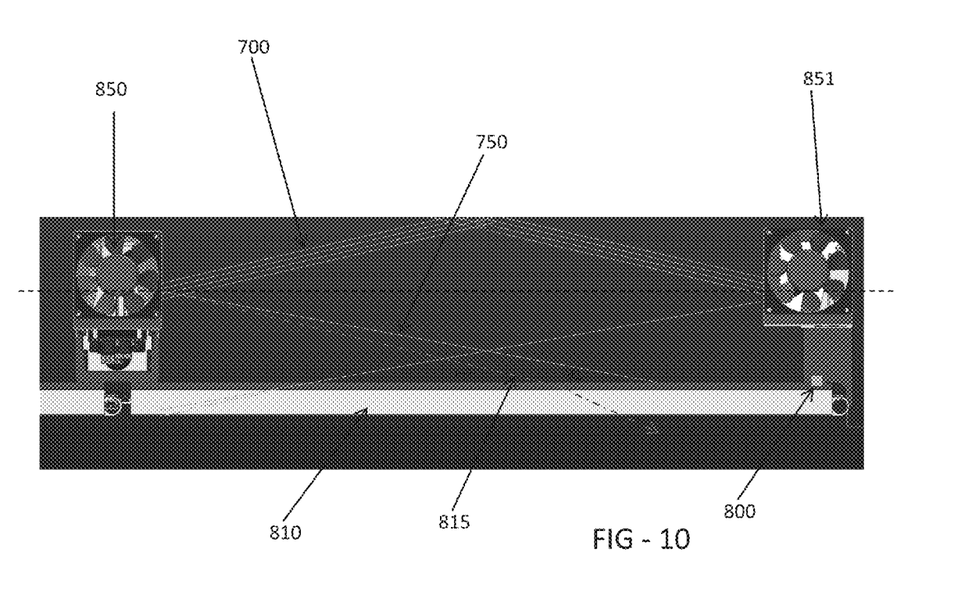
FIG. 10 is a top plan view of a pair of opposing mullions, showing the approximate ray trace of the resulting light pattern.

FIG. 10 is a top plan view of a pair of opposing mullions, showing the approximate ray trace of the resulting light pattern from the embodiments described above. Here, either (1) the lens 340 only, (2) the vertical louvers 225 only, (3) the flange 525 only, (4) the vertical louvers 225 and the lens 340, or (5) the flange 525 and the lens 340 direct the emitted light towards the rear of the case (away from the LCD/front glass assembly 810). The light rays 700 represent the resulting direction for the majority of the emitted light. The light ray 750 represents the maximum angle ($\Theta 1$) towards the LCD that the emitted light can poses without causes 'headlighting.' Here, light ray 815 indicates what would be known as headlighting, where a light ray exits the mullion lighting assembly and passes directly through the LCD/front glass 810 without reflecting off the interior of the display case or the goods within the display case. When headlighting occurs, an observer that is passing in front of the LCD may be able to observe the bright, point source of light from the LEDs. This is distracting to most observers and can be uncomfortable if very bright. Here, the angle ($\Theta 2$) at which the light ray 815 directly impacts the LCD is larger than the maximum angle (Θ1), such that headlighting occurs. It should be noted that while this phenomenon (as well as light ray 815) can be substantially eliminated by some of the embodiments described above, it is not a requirement of any embodiment of the invention to eliminate all headlighting.

In this particular embodiment, the front glass/LCD assembly 810 forms part of a door which can be opened/closed to provide access into the case by a consumer. A door sensor 800 is positioned such that an electrical signal can be generated which indicates whether the door is open or closed.

Figure 11:
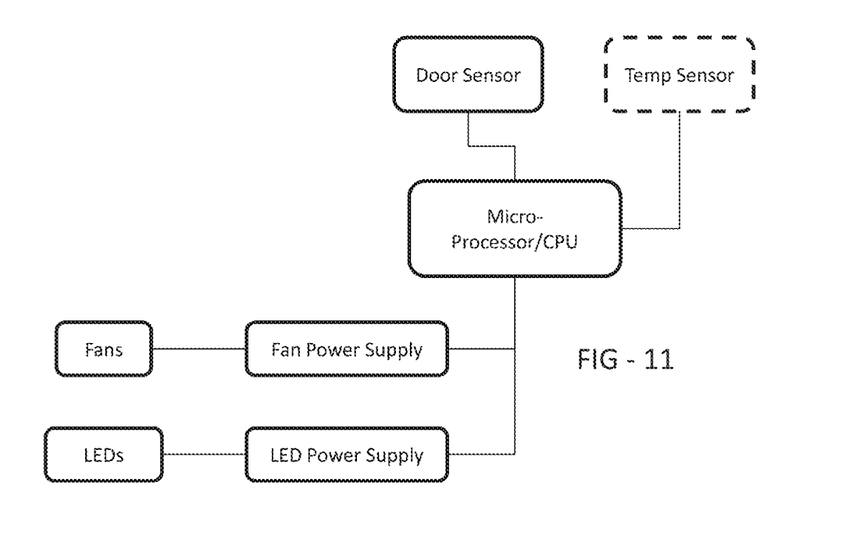
FIG. 11 is an electrical schematic of an embodiment for operating the transparent LCD lighting system.

FIG. 11 is an electrical schematic of an embodiment for operating the transparent LCD lighting system. A microprocessor/CPU is placed in electrical communication with the door sensor and an optional temperature sensor. The microprocessor/CPU may comprise any one of the following: EPROM, EEPROM, microprocessor, RAM, CPU, or any form of software driver capable of reading electrical signals from the door sensor and optional temperature sensor and controlling the power sent to the LEDs and to the fans. The temperature sensor is preferably positioned somewhere within the mullion lighting assembly to determine temperatures either within the center channel 310, at the LEDs 336, or at the electrical components 370. The microprocessor/CPU is also preferably in electrical communication with the fan power supply and LED power supply.

Figure 12:
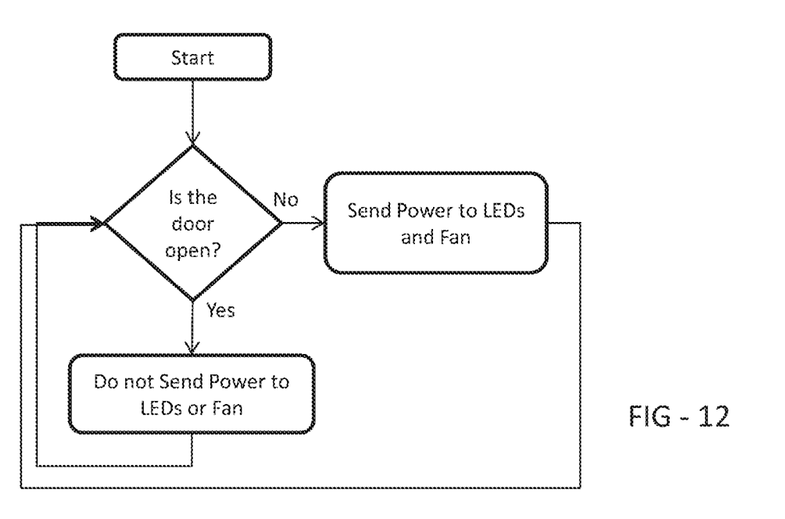
FIG. 12 is a flow chart for one embodiment of the software logic for operating the system shown in FIG. 11.

FIG. 12 is a flow chart for one embodiment of the software logic for operating the system shown in FIG. 11. To prevent the bright lights of the mullion lighting assemblies from impacting the sight of a consumer opening a display case, it may be desirable to turn off the LEDs when the door is opened. Also, to reduce the noise, it may be desirable to turn off the fans when the door is opened as well. For this method, the software continuously checks the door sensor to determine if the door has been opened. If not, power is sent to the LEDs and to the fan. Once the door is opened, no power is sent to the LEDs or the fan. The software would then return to check the door sensor to determine once it has closed.

Figure 13:
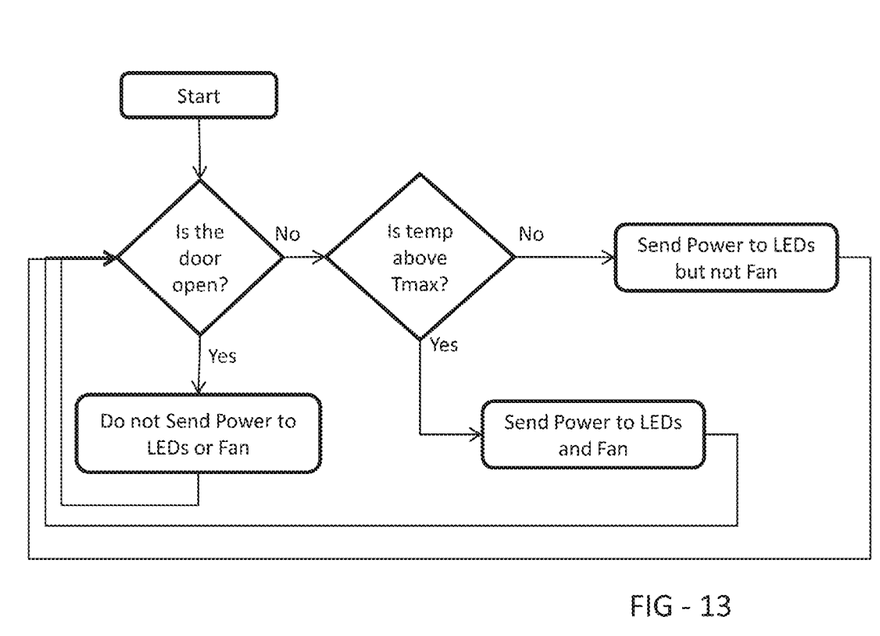
FIG. 13 is a flow chart for one embodiment of the software logic for operating the system shown in FIG. 11.

FIG. 13 is a flow chart for one embodiment of the software logic for operating the system shown in FIG. 11. This embodiment provides an extension from the method shown in FIG. 12 to account for a maximum temperature (Tmax) for the mullion lighting assembly. Again, when the door sensor determines that the door is open, no power is sent to the LEDs or fan. When the door sensor determines that the door is closed, the software moves to check the temperature sensor and compares the temperature measurement to Tmax. If the temperature is less than Tmax, then power is sent to the LEDs but not to the fan. If the temperature is greater than Tmax, then power is sent to the LEDs and to the fan.

Figure 14:
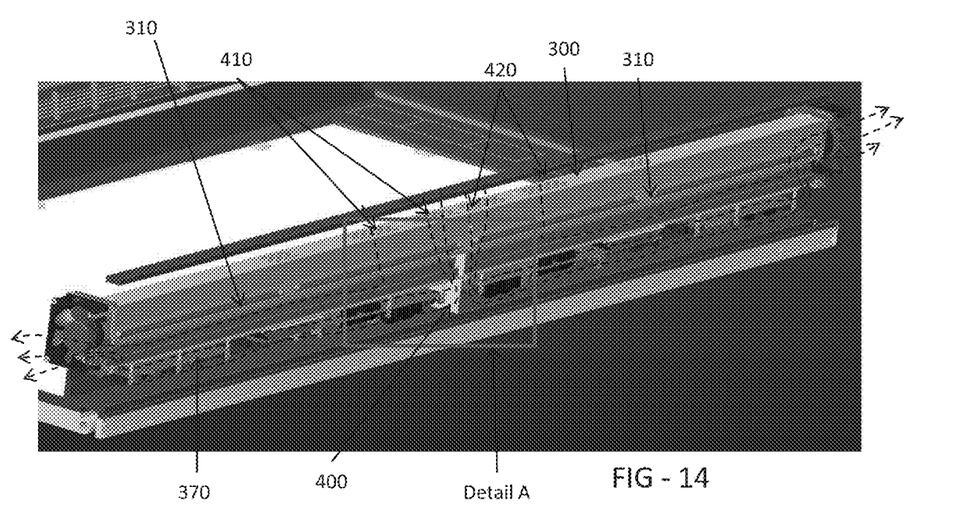
FIG. 14 is a perspective sectional view showing another optional air flow embodiment.

FIG. 14 is a perspective sectional view showing another optional air flow embodiment. In this embodiment, a dividing element 400 is positioned near the mid-point of the center channel 310, dividing the center channel into a first portion with apertures 410 and a second portion with apertures 420. A fan 100 is positioned at the exit of each portion. When the fan 100 is in operation, cooling air is drawn into the center channel 310 through apertures 410/420, pulled through the center channel 310, and exhausted at the exits near the fan 100. Of course, the opposite flow would also be possible, where cooling air is drawn into the channel 310 at the fan 100 and then exhausted out of the apertures 410/420. In this exemplary embodiment, a higher number of apertures are positioned near the dividing element 400 than near the fans 100. The apertures 410/420 are preferably positioned near the top of the center channel 310 sidewalls.

Notably in this embodiment, additional apertures are positioned on the sidewalls of the channel 310 which are adjacent to (and may be fastened to) the electrical components 370 so that an additional flow of cooling air can be used to cool the electrical components 370.

Figure 15:
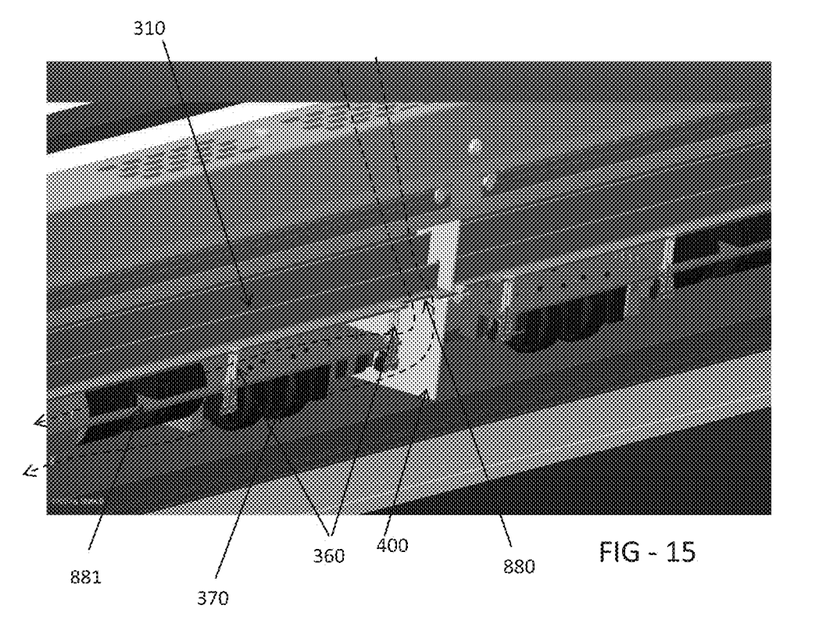
FIG. 15 is a detailed perspective sectional view showing detail A indicated in FIG. 14.

FIG. 15 is a detailed perspective sectional view showing detail A indicated in FIG. 14. As shown, aperture 880 is positioned on the sidewall of the channel 310 to allow cooling air to flow along the electrical components 370. Typically, the electrical components 370 contain printed circuit boards (PCBs) 881 and the embodiment shown allows cooling air to flow on both sides of the PCBs 881 (i.e. on the side facing the center channel 310 and on the side opposite the channel 310). Setoff mounts 360 may again be used to attach the PCBs 881 to the sidewalls of the channel 310 and preferably establish conductive thermal communication between the PCBs 881 and the sidewalls of the channel 310.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A lighting system for a transparent LCD having opposing vertical edges, the system comprising:
   a mullion lighting assembly positioned adjacent to each vertical edge of the transparent LCD, each mullion lighting assembly having sidewalls defining a center channel and;
   a plurality of LEDs positioned along the sidewall of each mullion lighting assembly and on a side of the sidewall that opposes the center channel, each LED having a central axis that is directed away from the transparent LCD; and
   a quantum dot film placed over the plurality of LEDs; and
   a thermal fin extending substantially normal from a sidewall into the center channel.

2. The lighting system of claim 1 further comprising:
   a fan positioned to draw cooling air through the center channel.

3. The lighting system of claim 2 further comprising:
   a dividing element positioned near a mid-point of the center channel, which divides the center channel into a first and a second portion; and
   a plurality of apertures in the sidewall which allow cooling air to enter and exit the center channel;
   wherein the fan is positioned to draw cooling air through the first portion and a second fan is positioned to draw cooling air through the second portion.

4. The lighting system of claim 2 further comprising:
   an aperture within the sidewall which allows cooling air to pass over the power supply for driving the LEDs.

5. The lighting system of claim 1 further comprising:
   a lens positioned adjacent to the LEDs.

6. The lighting system of claim 5 further comprising:
   collimating elements within the lens and positioned adjacent to each LED.

7. The lighting system of claim 1 further comprising:
a flange extending from a sidewall adjacent to the LEDs and positioned at an acute angle relative to the transparent LCD.

8. The lighting system of claim 1 further comprising:
a vertical louver position on each side of the LED and angled away from the LCD.

9. The lighting system of claim 1 further comprising:
a means for directing the light emitted from the LEDs away from the LCD.

10. The lighting system of claim 1 further comprising:
vertical louvers positioned adjacent to the LEDs and adapted to prevent headlighting through the LCD.

11. The lighting system of claim 1 further comprising:
a flange extending from the LEDs and adapted to prevent headlighting through the LCD.

12. The lighting system of claim 1 further comprising:
a power supply in electrical communication with the LEDs and placed in conductive thermal communication with the sidewall.

13. The lighting system of claim 1 wherein:
the thermal fin is located between the LEDs.

14. A lighting system for a first and second transparent LCD positioned side-by-side, the system comprising:
a mullion lighting assembly positioned between the first and second LCDs and having sidewalls defining a center channel where a first portion of the sidewall is adjacent to the first LCD and a second portion of the sidewall is adjacent to the second LCD;
a first plurality of LEDs positioned along the first portion of the sidewall and having a central axis that is angled away from the first LCD;
a second plurality of LEDs positioned along the second portion of the sidewall and having a central axis that is angled away from the second LCD;
a first quantum dot film placed directly atop the first plurality of LEDs;
a second quantum dot film placed directly atop the second plurality of LEDs; and
a lens positioned adjacent to the first and second plurality of LEDs, wherein said lens comprises collimating elements.

15. The lighting system of claim 14 wherein:
the first plurality of LEDs are in conductive thermal communication with the first portion of the sidewall; and
the second plurality of LEDs are in conductive thermal communication with the second portion of the sidewall.

16. The lighting system of claim 14 further comprising:
a fan positioned to draw cooling air through the center channel.

17. The lighting system of claim 16 further comprising:
a dividing element positioned near a mid-point of the center channel, which divides the center channel into a first and a second portion; and
a plurality of apertures in the sidewall which allow cooling air to enter and exit the center channel;
wherein the fan is positioned to draw cooling air through the first portion and a second fan is positioned to draw cooling air through the second portion.

18. The lighting system of claim 14 further comprising:
a thermal fin positioned within the center channel and in conductive thermal communication with a sidewall.

19. The lighting system of claim 18 wherein:
the thermal fin extends substantially normal from a sidewall into the center channel.

20. A lighting system for the door of a display case containing several retail products, the door having a transparent LCD positioned behind a front glass where the LCD has a pair of vertical edges, the system comprising:
a mullion lighting assembly positioned adjacent to each vertical edge of the transparent LCD, each mullion lighting assembly having sidewalls defining a center channel;
a plurality of LEDs positioned along a sidewall of each mullion lighting assembly and on a side of the sidewall that opposes the center channel, each LED is placed in conductive thermal communication with the sidewall and has a central axis aimed towards the retail products;
a quantum dot film placed between the LEDs and the retail products; and
a louver positioned over top of the plurality of LEDs, wherein the louver extends vertically along the mullion lighting assembly.

* * * * *